(12) United States Patent
Arya et al.

(10) Patent No.: US 12,705,844 B2
(45) **Date of Patent: *Aug. 11, 2026**

(54) BEACONS FOR LOCALIZATION AND CONTENT DELIVERY TO WEARABLE DEVICES

(71) Applicant: Snap Inc., Santa Monica, CA (US)

(72) Inventors: Ashwani Arya, Cypress, CA (US); Alex Feinman, San Mateo, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,574

(22) Filed: Aug. 28, 2024

(65) Prior Publication Data

US 2024/0420434 A1 Dec. 19, 2024

Related U.S. Application Data

(63) Continuation of application No. 18/206,292, filed on Jun. 6, 2023, now Pat. No. 12,094,068, which is a (Continued)

(51) Int. Cl.

*G02B 27/01* (2006.01)
*G06F 3/01* (2006.01)
(Continued)

(52) U.S. Cl.

CPC ............ *G06T 19/006* (2013.01); *G06F 3/012* (2013.01); *G06F 3/03547* (2013.01); (Continued)

(58) Field of Classification Search

CPC .... G06T 19/006; H04W 4/029; H04W 4/023; H04W 8/005; H04W 4/00; H04W 4/02; (Continued)

(56) References Cited

U.S. PATENT DOCUMENTS

| | | |
|---|---|---|
| 9,710,970 B2 | 7/2017 | Jung et al. |
| 9,746,671 B2 | 8/2017 | Fujigaki |

(Continued)

FOREIGN PATENT DOCUMENTS

| | | |
|---|---|---|
| CN | 110222197 A | 9/2019 |
| KR | 20170078371 A | 7/2017 |

OTHER PUBLICATIONS

International Search Report and Written Opinion for International Application No. PCT/US2022/029550, dated Sep. 1, 2022 (Jan. 9, 2022)—12 pages.

(Continued)

*Primary Examiner* — Chanh D Nguyen
*Assistant Examiner* — Nguyen H Truong
(74) *Attorney, Agent, or Firm* — CM Law; Stephen J. Weed

(57) ABSTRACT

Example systems, devices, media, and methods are described for presenting a virtual experience using the display of an eyewear device in augmented reality. A content delivery application implements and controls the detecting of beacons broadcast from beacon transmitters deployed at fixed locations and determining the current eyewear location based on the detected beacons. The method includes retrieving content and presenting a virtual experience based on the retrieved content, the beacon data, and a user profile. The virtual experience includes playing audio messages, presenting text on the display, playing video segments on the display, and combinations thereof. In addition to wireless detection of beacons, the method includes scanning and decoding a beacon activation code positioned near the beacon transmitter to access a beacon.

16 Claims, 12 Drawing Sheets

Related U.S. Application Data continuation of application No. 17/746,020, filed on May 17, 2022, now Pat. No. 11,699,271.

(60) Provisional application No. 63/190,663, filed on May 19, 2021.

(51) Int. Cl.

| | |
|---|---|
| ***G06F 3/0354*** | (2013.01) |
| ***G06F 3/0482*** | (2013.01) |
| ***G06F 3/16*** | (2006.01) |
| ***G06F 16/9537*** | (2019.01) |
| ***G06T 19/00*** | (2011.01) |
| ***H04N 5/445*** | (2011.01) |
| ***H04W 4/02*** | (2018.01) |
| ***H04W 4/029*** | (2018.01) |
| ***H04W 8/00*** | (2009.01) |
| *G06F 1/16* | (2006.01) |
| *G10L 15/26* | (2006.01) |

(52) U.S. Cl.
CPC ............ *G06F 3/0482* (2013.01); *G06F 3/167* (2013.01); *G06F 16/9537* (2019.01); *H04W 4/023* (2013.01); *H04W 4/029* (2018.02); *H04W 8/005* (2013.01); *G06F 1/163* (2013.01); *G06T 2200/24* (2013.01); *G10L 15/26* (2013.01)

(58) Field of Classification Search
CPC ..... H04W 4/021; H04W 4/80; G06F 16/9537; G06F 3/012; G06F 3/03547; G06F 3/0482; G06F 3/167; G06F 1/163; G10L 15/26; G06Q 20/32; G06Q 20/40; H04N 21/4335; G01S 1/20; G01S 5/10; G09B 29/00; G09G 5/00
See application file for complete search history.

(56) References Cited

U.S. PATENT DOCUMENTS

| | | | | |
|---|---|---|---|---|
| 10,149,159 | B1 | 12/2018 | Perfitt | |
| 10,901,218 | B2 | 1/2021 | Jones et al. | |
| 11,699,271 | B2 | 7/2023 | Arya et al. | |
| 11,995,683 | B2 * | 5/2024 | Hardham | G06Q 30/0261 |
| 12,094,068 | B2 | 9/2024 | Arya et al. | |
| 2012/0038669 | A1 | 2/2012 | Lee et al. | |
| 2013/0050258 | A1 * | 2/2013 | Liu | G06F 3/013 345/633 |
| 2014/0098132 | A1 * | 4/2014 | Fein | G06T 19/006 345/633 |
| 2014/0300532 | A1 | 10/2014 | Karkkainen et al. | |
| 2015/0262117 | A1 | 9/2015 | Li | |
| 2016/0004527 | A1 | 1/2016 | Udd | |
| 2016/0042351 | A1 | 2/2016 | Syed et al. | |
| 2017/0061490 | A1 | 3/2017 | Ghahremani et al. | |
| 2017/0201708 | A1 * | 7/2017 | Igarashi | H04N 23/63 |
| 2018/0024362 | A1 | 1/2018 | Williamson | |
| 2018/0181810 | A1 | 6/2018 | Jhawar et al. | |
| 2018/0302403 | A1 | 10/2018 | Souders et al. | |
| 2020/0084605 | A1 | 3/2020 | Fraccaroli | |
| 2020/0259877 | A1 | 8/2020 | Girardier et al. | |
| 2020/0359160 | A1 | 11/2020 | Hare | |
| 2021/0295602 | A1 * | 9/2021 | Scapel | G06T 15/40 |

OTHER PUBLICATIONS

Extended European Search Report for EP Application No. 25157272.3 dated May 12, 2025 (May 12, 2025)—16 pages.

* cited by examiner

BEACONS FOR LOCALIZATION AND CONTENT DELIVERY TO WEARABLE DEVICES

CROSS-REFERENCE TO RELATED APPLICATIONS

This application is a Continuation of U.S. application Ser. No. 18/206,292 filed on Jun. 6, 2023, which is a Continuation of U.S. application Ser. No. 17/746,020 filed on May 17, 2022, now U.S. Pat. No. 11,699,271, which claims priority to U.S. Provisional Application Ser. No. 63/190,663 filed on May 19, 2021, the contents of each are incorporated fully herein by reference.

TECHNICAL FIELD

Examples set forth in the present disclosure relate to the field of augmented reality experiences for electronic devices, including wearable devices such as eyewear. More particularly, but not by way of limitation, the present disclosure describes the use of beacons to localize wearable devices, to deliver relevant content, and to present virtual experiences in augmented reality.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays.

Beacon transmitters are wireless transmitters that periodically broadcast a beacon that includes a unique identifier and one or more packets of data. Bluetooth or BLE beacons typically operate using the Bluetooth Low Energy (BLE) communications protocol. In some applications, two or more beacons are coupled or attached to objects or fixed locations in a physical environment. Based on the characteristics of the received beacons, a receiving device (e.g., a mobile device, wearable device, or other smart device) can compute its approximate location relative to the beacon locations. BLE beacons typically transmit information at a frequency of about 2.4 GHZ, have a range of about three hundred feet, and operate on relatively low power (e.g., as low as ten milliwatts). Using the BLE protocol, data can be transmitted at a rate of up to two megabits per second (Mbit/s) with an application throughput of up to 1.37 Mbit/s. In some implementations, BLE messages are secured using encryption.

Optical codes, such as barcodes, QR codes, and MaxiCodes, are two-dimensional graphical images that contain encoded information readable by a camera or other optical sensor, such as those found in mobile devices, wearable devices, and other smart devices. Optical codes typically include one or more functional patterns (e.g., for identification, reading, and decoding the embedded information) along with non-functional elements or patterns (e.g., a logo, brand, trademark, trade dress, or other source identifier) to facilitate recognition by users.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

Graphical user interfaces allow the user to interact with displayed content, including virtual objects and graphical elements such as icons, taskbars, list boxes, menus, buttons, and selection control elements like cursors, pointers, handles, and sliders.

Automatic speech recognition (ASR) is a field of computer science, artificial intelligence, and linguistics which involves receiving spoken words and converting the spoken words into audio data suitable for processing by a computing device. Processed frames of audio data can be used to translate the received spoken words into text or to convert the spoken words into commands for controlling and interacting with various software applications. ASR processing may be used by computers, handheld devices, wearable devices, telephone systems, automobiles, and a wide variety of other devices to facilitate human-computer interactions.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
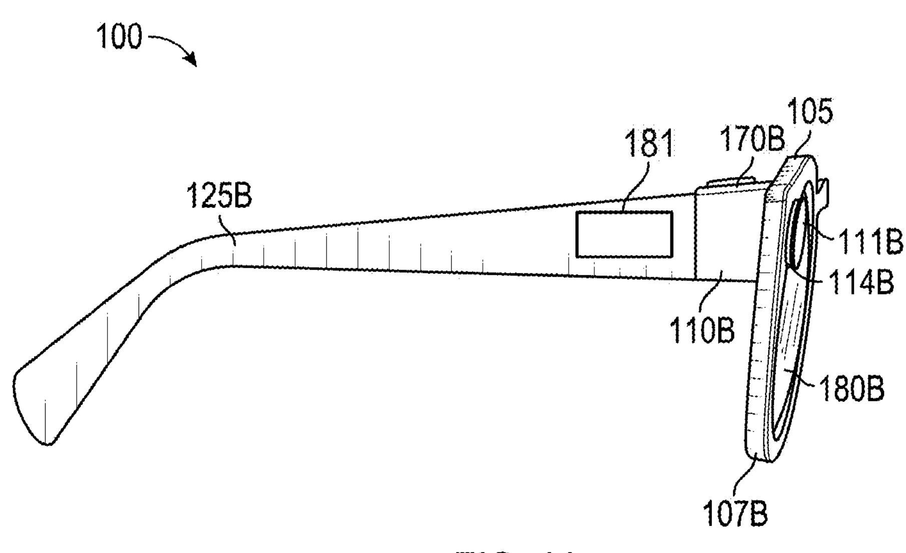
FIG. 1A is a side view (right) of an example hardware configuration of an eyewear device suitable for use in an example content delivery system.

Various implementations and details are described with reference to examples for presenting a virtual experience in augmented reality. For example, a number of beacon transmitters are programmed and deployed in a physical environment, such as an indoor space. The broadcast beacons are detected by an eyewear device, which uses the beacons to determine the current eyewear location and to retrieve relevant content. The retrieved content is used to present a virtual experience on the display of the eyewear as an overlay relative to the physical environment.

Example methods include detecting a beacon broadcast by a beacon transmitter that is associated with a fixed beacon location in a physical environment. The beacon includes a unique identifier, beacon data, and a device certificate. The process in some examples includes determining whether the detected beacon satisfies a device certificate rule, and then determining the current eyewear location relative to the fixed beacon location (e.g., using one or more multilateration algorithms). The method includes retrieving content in accordance with the detected beacon. The retrieved content, in some examples, is used to curate a virtual experience that is also based on the beacon data and a user profile. The method includes presenting the curated virtual experience on the display in accordance with the determined current eyewear location and as an overlay relative to the physical environment. The process of presenting the curated virtual experience includes playing an audio message through the loudspeaker, presenting text on the display, presenting a video segment on the display, and combinations thereof.

Although the various systems and methods are described herein with reference to curating and presenting a virtual experience in response to BLE beacons detected in an indoor environment, the technology described may be applied to detecting any type of beacon or signal, retrieving information or taking other action in response to the signal, and presenting relevant content to a user.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, coupled components, and any other devices such as those shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera, inertial measurement unit, or display as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device such as a touchpad 181. As shown, the touchpad 181 may have a boundary that is plainly visible or include a raised or otherwise tactile edge that provides feedback to the user about the location and boundary of the touchpad 181; alternatively, the boundary may be subtle and not easily seen or felt. In other implementations, the eyewear device 100 may include a touchpad 181 on the left side that operates independently or in conjunction with a touchpad 181 on the right side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Tapping or double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
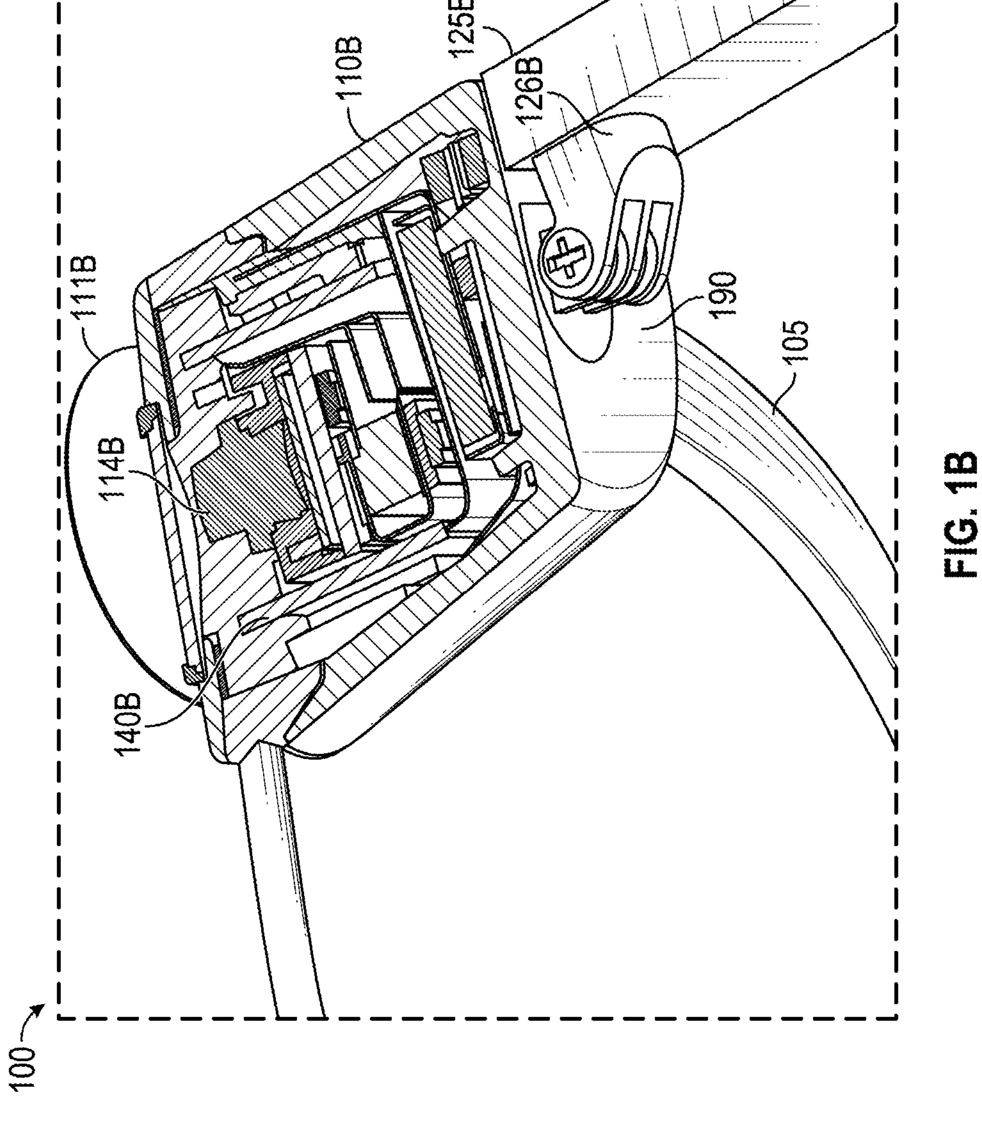
FIG. 1B is a perspective, partly sectional view of a right corner of the eyewear device of FIG. 1A depicting a right visible-light camera, and a circuit board.
Figure 1C:
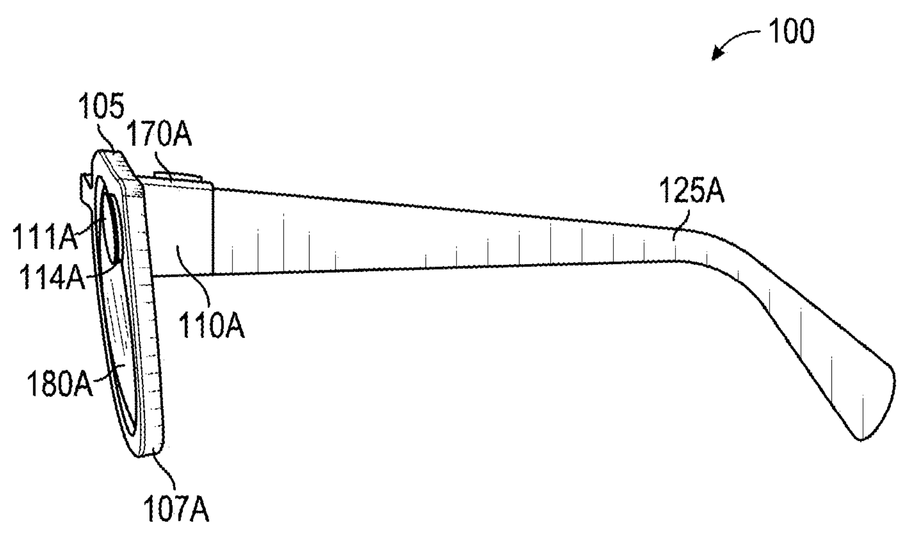
FIG. 1C is a side view (left) of an example hardware configuration of the eyewear device of FIG. 1A, which shows a left visible-light camera.
Figure 1D:
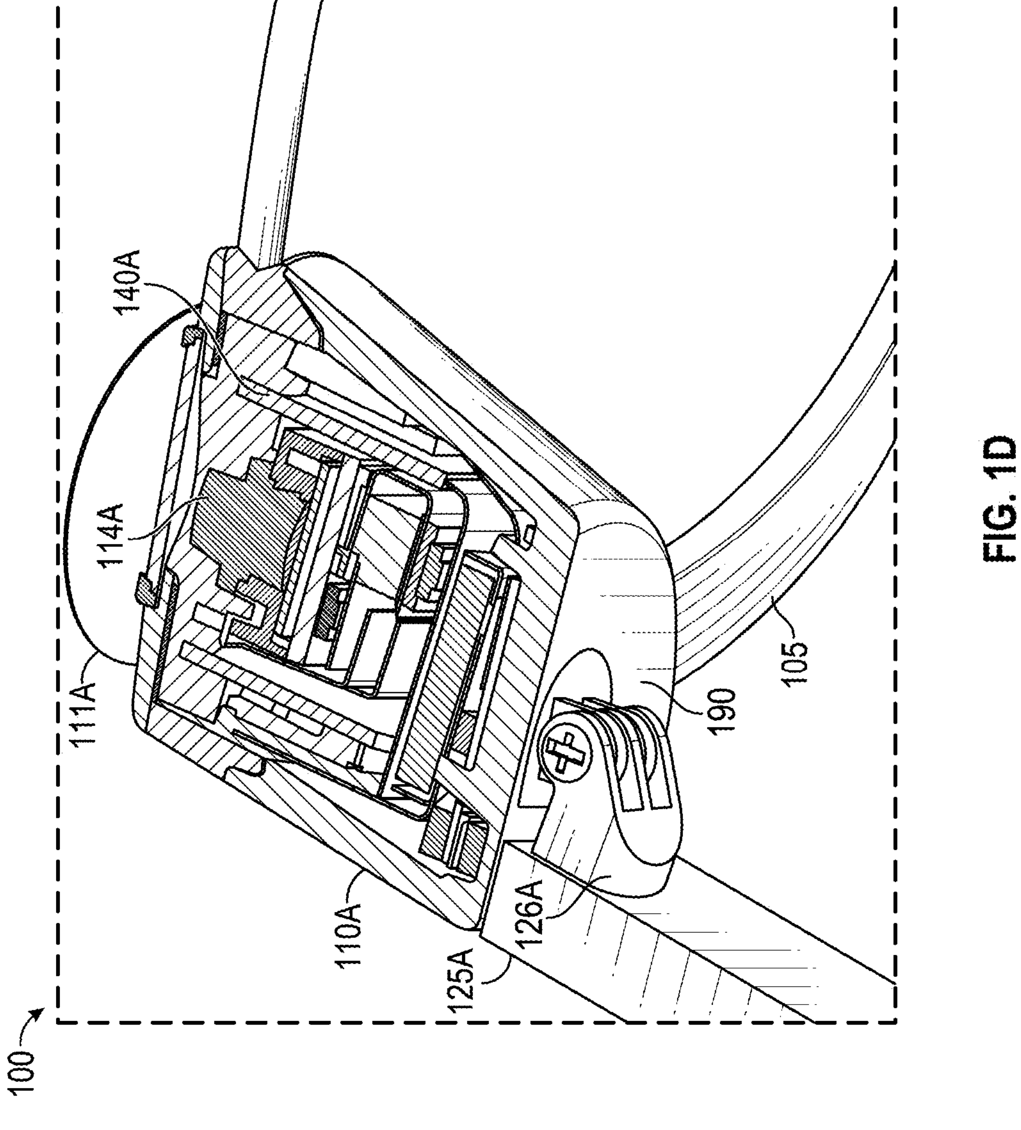
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
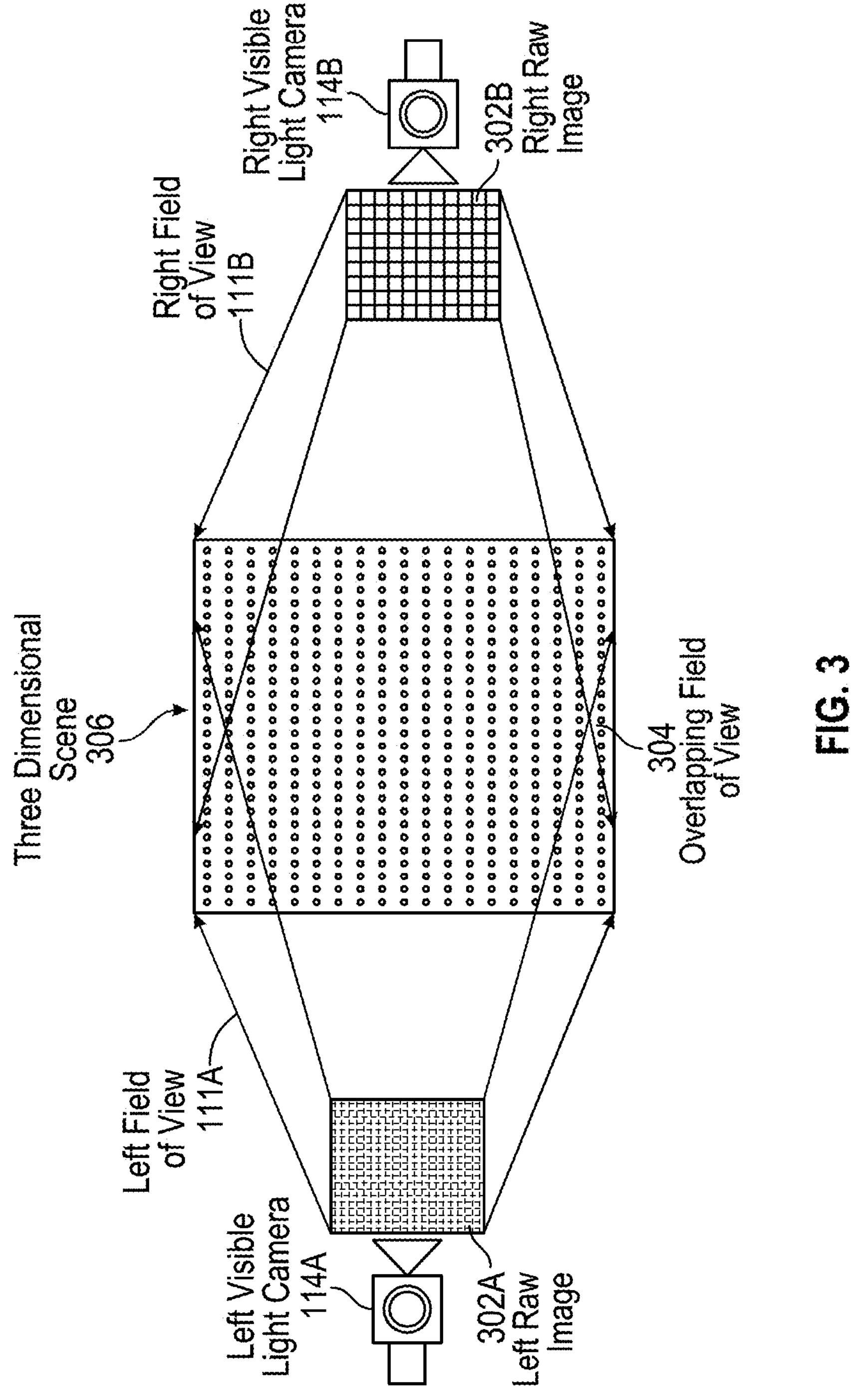
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG.

1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126A connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s) 139, loudspeaker (s) 191, low-power wireless circuitry (e.g., for wireless short range network communication via Bluetooth™), high-speed wireless circuitry (e.g., for wireless local area network communication via Wi-Fi).

Figure 2A:
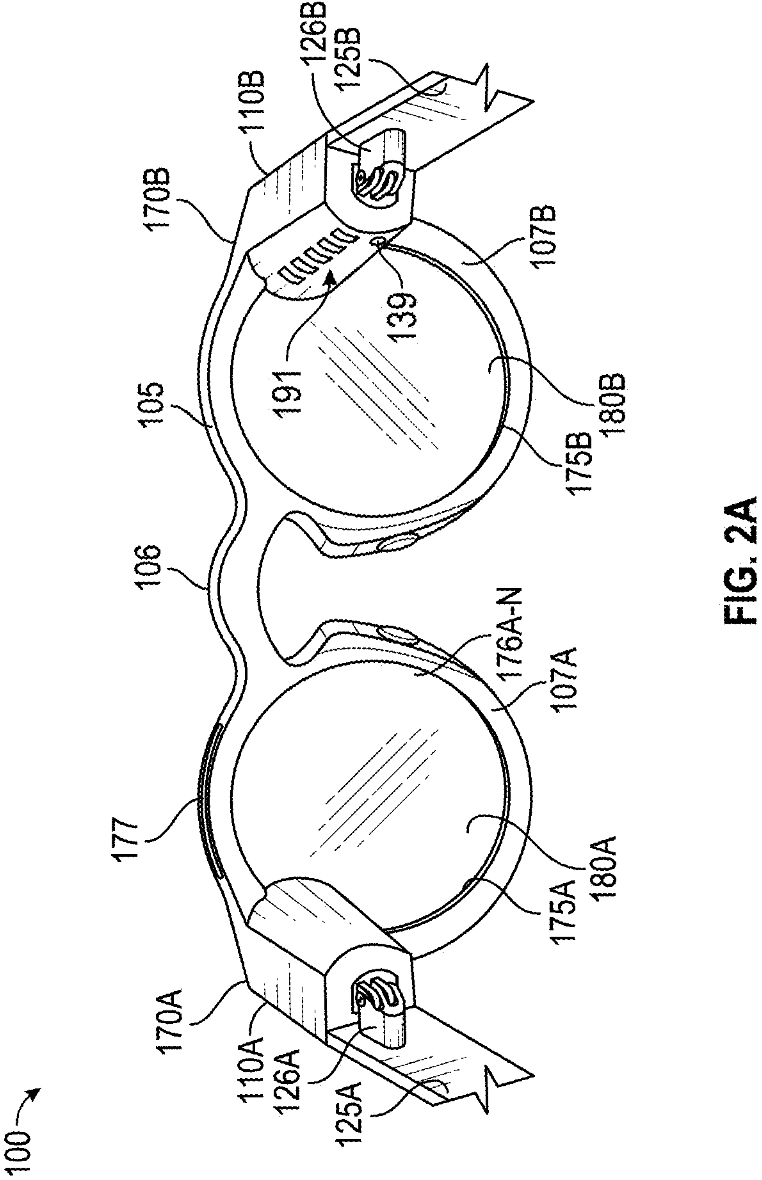
FIGS. 2A and 2B are rear views of example hardware configurations of an eyewear device utilized in an example content delivery system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
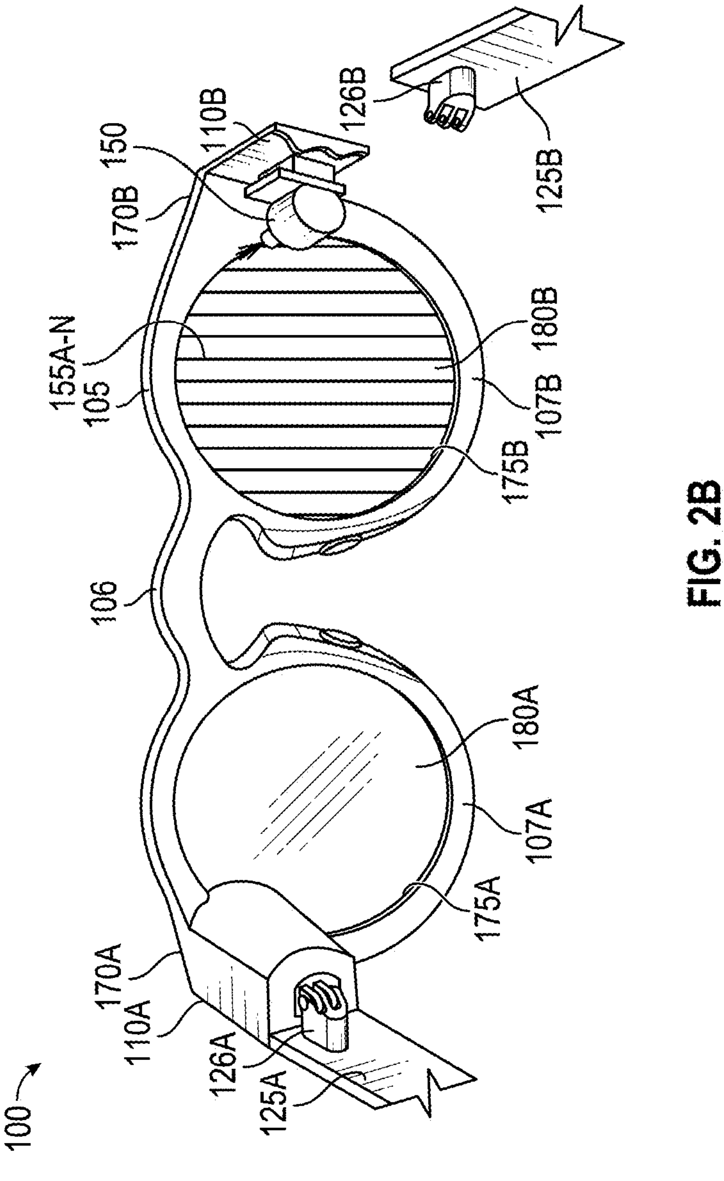

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

FIG. 2A is an example hardware configuration for the eyewear device 100 in which the right corner 110B supports a microphone 139 and a loudspeaker 191. The microphone 139 includes a transducer that converts sound into a corresponding electrical audio signal. The microphone 139 in this example, as shown, is positioned with an opening that faces inward toward the wearer, to facilitate reception of the sound waves, such as human speech including verbal commands and questions. Additional or differently oriented openings may be implemented. In other example configurations, the eyewear device 100 is coupled to one or more microphones 139, configured to operate together or independently, and positioned at various locations on the eyewear device 100.

Figure 4:
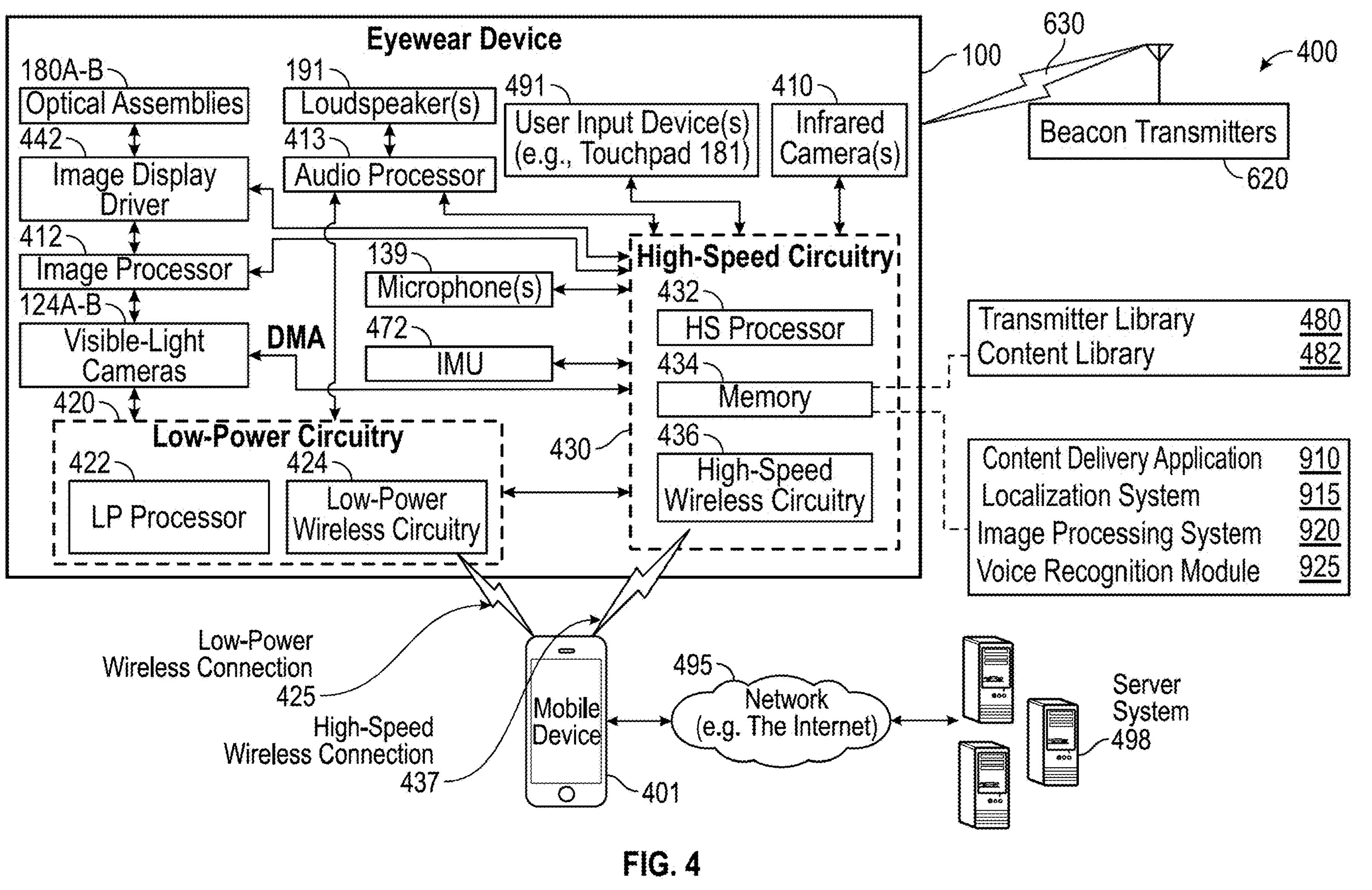
FIG. 4 is a functional block diagram of an example content delivery system including an eyewear device and a server system connected via various networks.

The loudspeaker 191 includes an electro-acoustic transducer that converts an electrical audio signal into a corresponding sound. The loudspeaker 191 is controlled by one of the processors 422, 432 or by an audio processor 413 (FIG. 4). The loudspeaker 191 in this example includes a series of oblong apertures, as shown, that face inward to direct the sound toward the wearer. Additional or differently oriented apertures may be implemented. In other example configurations, the eyewear device 100 is coupled to one or more loudspeakers 191, configured to operate together (e.g., in stereo, in zones to generate surround sound) or independently, and positioned at various locations on the eyewear device 100. For example, one or more loudspeakers 191 may be incorporated into the frame 105, temples 125, or corners 110A, 110B of the eyewear device 100.

Although shown in FIG. 2A and FIG. 2B as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector 150. The left optical assembly 180A may include a left display matrix 177 or a left set of optical strips (not shown), which are configured to interact with light from the left projector. Similarly, the right optical assembly 180B may include a right display matrix (not shown) or a right set of optical strips 155A, 155B, . . . 155N, which are configured to interact with light from the right projector 150. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene-overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time-a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the content delivery system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

FIG. 4 is a functional block diagram of an example content delivery system 400 that includes an eyewear device 100), a mobile device 401, and a server system 498 connected via various networks 495 such as the Internet. As shown, the content delivery system 400 includes a low-power wireless connection 425 and a high-speed wireless connection 437 between the eyewear device 100 and the mobile device 401.

The example content delivery system 400, as shown in FIG. 4, includes one or more beacon transmitters 620 in wireless communication with the eyewear device 100 which, in turn, is in wireless communication with one or more mobile devices 401. In some implementations, these devices 620, 100, 401 operate as nodes in a network. Network data may be stored locally or remotely, on the servers or securely in the cloud.

The beacon transmitters 620 in some implementations are installed at an indoor location, such as a retail store, a restaurant, an art gallery, and the like, and at other locations where the location owner or operator desires to broadcast content, offers, features, and other information to users in the vicinity. The beacon transmitters 620 broadcast a beacon 630, as shown, which in some implementation is a Bluetooth Low Energy (BLE) beacon.

As used herein, the term beacon 630 refers to and includes a signal broadcast according to any of a variety of wireless communications protocols, such as Bluetooth® Bluetooth Low Energy (BLE), Ultra-wideband (UWB), Wi-Fi (802.11), Near-Field Communication (NFC), Radio Frequency Identification (RFID), ZigBec, DigiMesh, Video-LAN Client (VLC), DECT (Digital European Cordless Telecommunications), and the like.

The beacon transmitters 620 in some implementations includes a microcontroller, a memory, a transmitter, an antenna, and a power source (e.g., a replaceable or rechargeable battery). Some beacon transmitters 620 include or are coupled to one or more supplemental elements and sensors (e.g., current time, current date, motion detectors, light sensors, temperature sensors, accelerometers).

The beacon 630 in some implementations includes a unique identifier, beacon data, and a device certificate. The beacon data in some implementations includes a preamble, a payload, one or more packets of data, metadata, content (e.g., text, audio files, video segments), current sensor data captured by the supplemental elements or sensors coupled to the beacon transmitter 620, and the like. The physical layer of each beacon 630 may be assembled according to applicable standards, such as the BLE standards and BLE core specifications. The beacon 630 is broadcast repeatedly and periodically (e.g., ten times per second). The beacon 630 is a short burst of electromagnetic energy having a duration sufficient for a receiving device (e.g., an eyewear device 100) to extract the information contained in the beacon 630.

The device certificate in some implementations includes a source identifier indicating the identity of the owner or operator that installed, deployed, configured, and programmed the beacons 630 and the beacon transmitters 620. In this aspect, beacon transmitters 620 are programmable and customizable, so that a developer or owner can design the format and contents to be included in the beacon 630, including the device certificate.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor that uses infrared signals to estimate the position of objects relative to the device 100. The depth sensor in some examples includes one or more infrared emitter(s) and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

As shown in FIG. 4, various elements of the eyewear device 100 can be coupled to the low-power circuitry 420, high-speed circuitry 430, or both. For example, the infrared camera 410 (including in some implementations an infrared emitter), the user input devices 491 (e.g., touchpad 181), the microphone(s) 139, and the inertial measurement unit (IMU) 472 may be coupled to the low-power circuitry 420, high-speed circuitry 430, or both.

Figure 5:
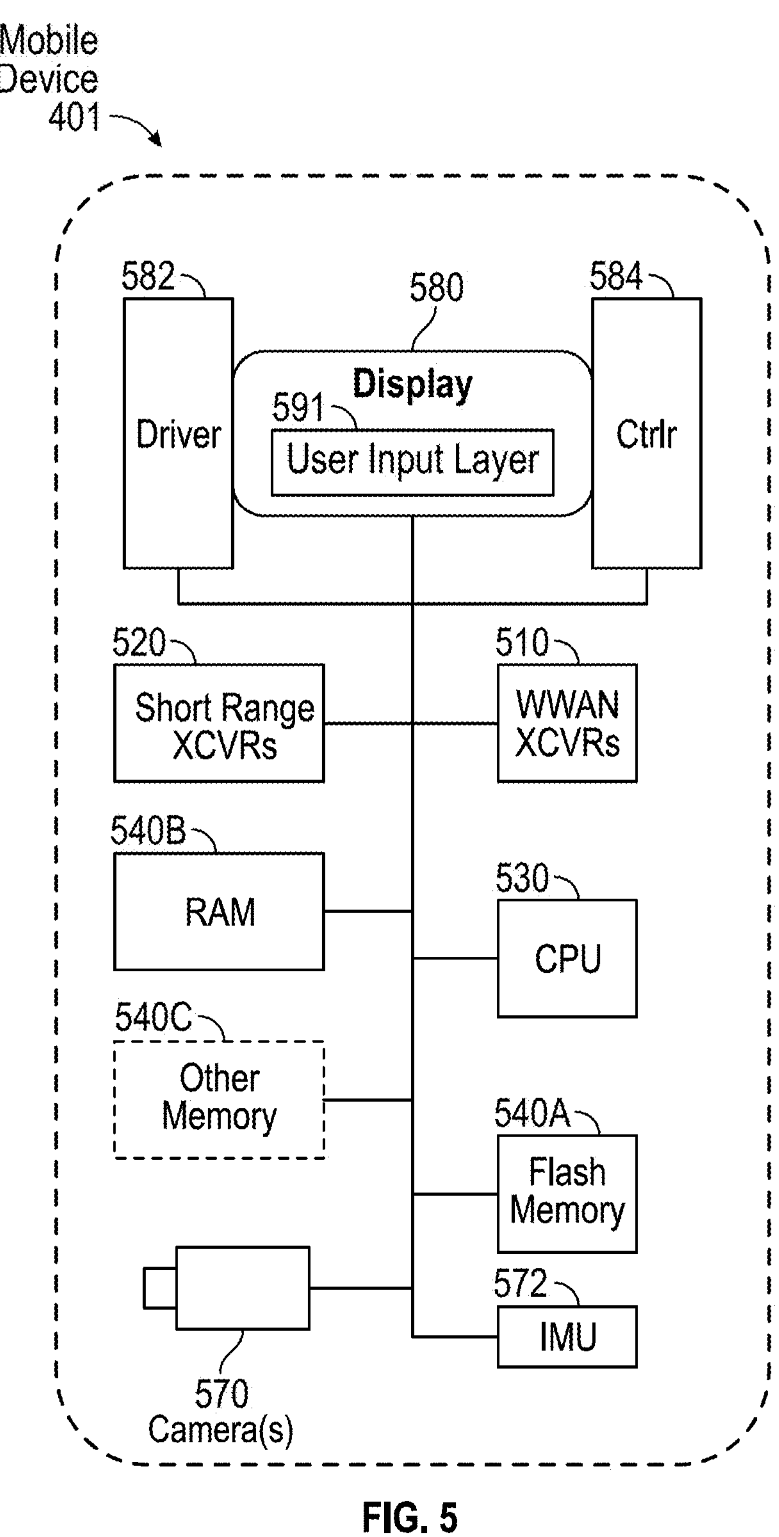
FIG. 5 is a diagrammatic representation of an example hardware configuration for a mobile device suitable for use with the example content delivery system of FIG. 4.

As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker 191, or a vibrating actuator), or an outward-facing signal (e.g., an LED, a loudspeaker 191). The image displays of each optical assembly 180A, 180B are driven by the image display driver 442. In some example configurations, the output components of the eyewear device 100 further include additional indicators such as audible elements (e.g., loudspeakers 191), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers 191 positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker 191, or an actuator that is configured and positioned to be sensed by an observer.

The input components of the eyewear device 100 may include alphanumeric input components (e.g., a touch screen or touchpad 181 configured to receive alphanumeric input, a photo-optical keyboard, or other alphanumeric-configured elements), pointer-based input components (e.g., a mouse, a touchpad 181, a trackball, a joystick, a motion sensor, or other pointing instruments), tactile input components (e.g., a button switch, a touch screen or touchpad 181 that senses the location, force or location and force of touches or touch gestures, or other tactile-configured elements), and audio input components (e.g., a microphone 139), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The content delivery system 400, as shown in FIG. 4, includes a computing device, such as mobile device 401, coupled to an eyewear device 100 over a network. The content delivery system 400 includes a memory for storing instructions and a processor for executing the instructions. Execution of the instructions of the content delivery system 400 by the processor 432 configures the eyewear device 100 to cooperate with the mobile device 401. The content delivery system 400 may utilize the memory 434 of the eyewear device 100 or the memory elements 540A, 540B, 540C of the mobile device 401 (FIG. 5). Also, the content delivery system 400 may utilize the processor elements 432, 422 of the eyewear device 100 or the central processing unit (CPU) 530 of the mobile device 401 (FIG. 5). In addition, the content delivery system 400 may further utilize the memory and processor elements of the server system 498. In this aspect, the memory and processing functions of the content delivery system 400 can be shared or distributed across the processors and memories of the eyewear device 100, the mobile device 401, and the server system 498.

In some implementations, the memory 434 includes or is coupled to a content delivery application 910, a localization system 915, an image processing system 920, and a voice recognition module 925.

The content delivery application 910 in some implementations configures the processor 432 to detect one or more beacons 630 broadcast by beacon transmitters 620, retrieve content 880 associated with the detected beacons, and present a virtual experience 700 as described herein.

The localization system 915 in some implementations configures the processor 432 to determine the current location 840 of the eyewear device 100 relative to the physical environment 600. In outdoor environments, the current eyewear location 840 may be derived from data gathered by a GPS unit, an inertial measurement unit 472, a camera 114B, or a combination thereof. In indoor environments and other places where GPS data is not available or not sufficient, the current eyewear location 840 in some implementations is calculated using one or more beacons 630.

The image processing system 920 configures the processor 432 to present one or more graphical elements on a display of an optical assembly 180A, 180B in cooperation with the image display driver 442 and the image processor 412.

The voice recognition module 925 configures the processor 432 to perceive human speech with a microphone 139, convert the received speech into frames of audio data 905, identify a command or inquiry based on the audio data 905, and execute an action (or assemble a response) in response to the identified command or inquiry.

As shown in FIG. 4, the example content delivery system 400 is coupled to a transmitter library 480 and a content library 482. The eyewear device 100, as shown, is coupled to or otherwise in communication with the libraries 480, 482.

The transmitter library 480 stores data about each of the beacon transmitters 620, including its fixed beacon location 720 relative to the physical environment 600, the physical object 650 it is persistently associated with, and the characteristics of the beacon 630 it broadcasts (e.g., the unique identifier, the beacon data, the device certificate).

The content library 482 stores data about each of a content items (e.g., text, audio files, video segments). The data record for each item of content may include a name, a unique identifier, a category or topic, and a variety of other information that would be useful in cataloguing and retrieving the content. The content is stored and maintained for easy access and use when the system retrieves content associated with a detected beacon 630.

The libraries 480 482 in some implementations operate as a set of relational databases with one or more shared keys linking the stored data to other database entries, and a database management system for maintaining and querying each database.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in one or more memory elements 540A, 540B, 540C and executed by the CPU 530 of the client device 401.

The transceivers 510, 520 (i.e., the network communication interface) conform to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit, motion and acceleration data received from an IMU 472, or a combination of data from such sensors, or from other sensors that provide data useful in determining positional information.

Figure 6:
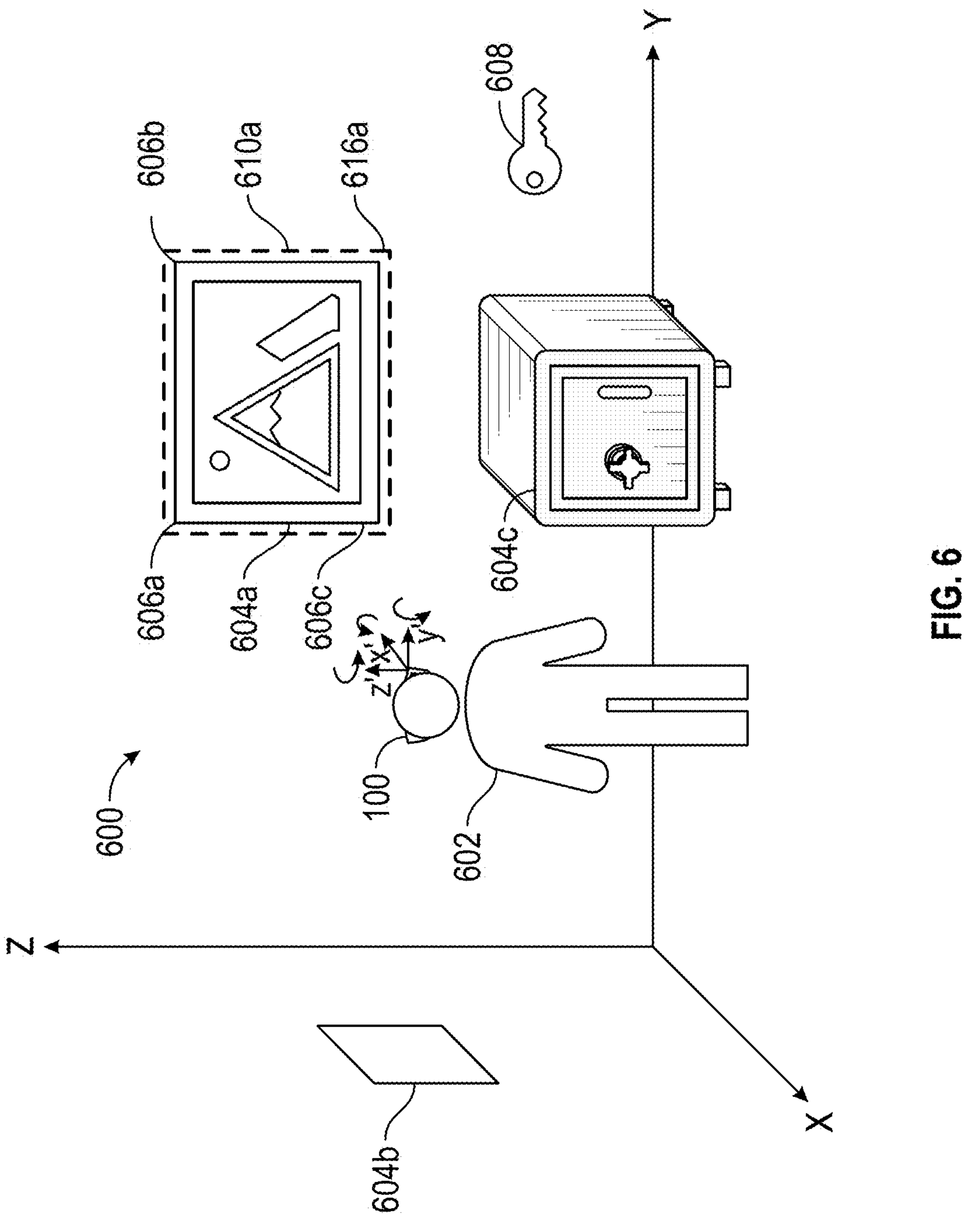
FIG. 6 is a schematic illustration of a user in an example environment for use in describing simultaneous localization and mapping.

FIG. 6 depicts an example physical environment 600 along with elements that are useful when using a SLAM application and other types of tracking applications (e.g., natural feature tracking (NFT)). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606*a*, 606*b*, and 606*c*) associated with a single object 604*a*, or by using one or more location points 606 associated with two or more objects 604*a*, 604*b*, 604*c*. The processor 432 of the eyewear device 100 may position a virtual object 608 (such as the key shown in FIG. 6) within the environment 600 for viewing during an augmented reality experience.

The localization system 915 in some examples a virtual marker 610*a* associated with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604*a*, mounted on a lighter-colored wall, to assist cameras and other sensors with the task of detecting the marker. The markers may be preassigned or may be assigned by the eyewear device 100 upon entering the environment. Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610*a*, the marker's position (location and orientation), one or more virtual objects, or a combination thereof. The marker position may include three-dimensional coordinates for one or more marker landmarks 616*a*, such as the corner of the generally rectangular marker 610*a* shown in FIG. 6. The marker location may be expressed relative to real-world geographic coordinates, a system of marker coordinates, a position of the eyewear device 100, or other coordinate system. The one or more virtual objects associated with the marker 610*a* may include any of a variety of material, including still images, video, audio, tactile feedback, executable applications, interactive user interfaces and experiences, and combinations or sequences of such material. Any type of content capable of being stored in a memory and retrieved when the marker 610*a* is encountered or associated with an assigned marker may be classified as a virtual object in this context. The key 608 shown in FIG. 6, for example, is a virtual object displayed as a still image, either 2D or 3D, at a marker location.

In one example, the marker 610*a* may be registered in memory as being located near and associated with a physical object 604*a* (e.g., the framed work of art shown in FIG. 6). In another example, the marker may be registered in memory as being a particular position with respect to the eyewear device 100.

Figure 8:
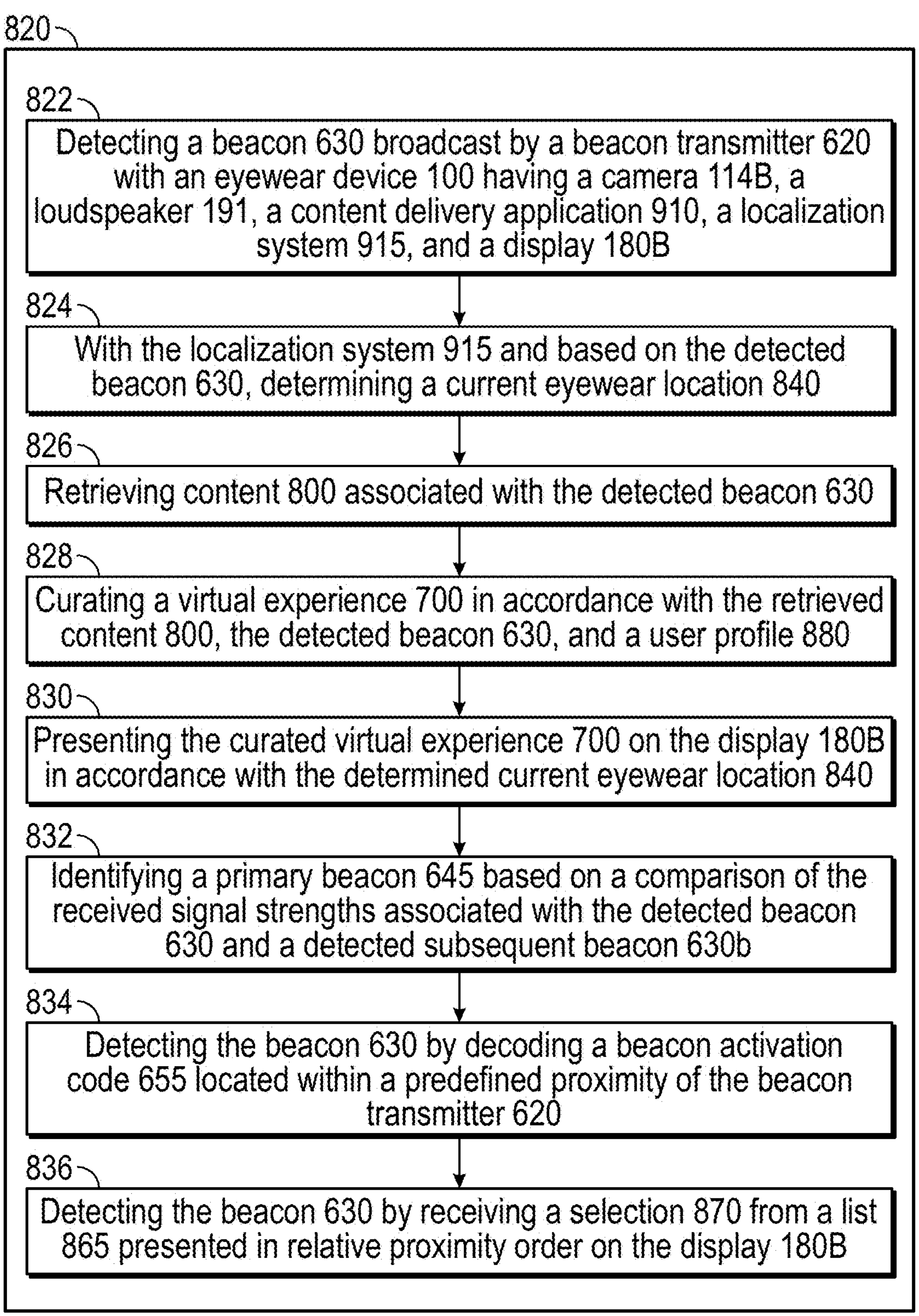
FIG. 8 is a flow chart listing the steps in an example method of presenting a virtual experience on a display.

FIG. 8 is a flow chart 820 listing the steps in an example method of presenting a virtual experience 700 on the display 180B of an eyewear device 100. Although the steps are described with reference to the eyewear device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

The content delivery application 910 described herein, in some implementations, starts in response to receiving a selection through a user interface (e.g., selecting from a menu, pressing a button, using a touchpad) or through some other input means (e.g., hand gesture, finger motion, voice command). In other examples, the content delivery application 910 starts in response to detecting a beacon 630 as described herein.

Block 822 in FIG. 8 describes an example step of detecting a beacon 630 with the wireless communications circuitry 420, 430 of an eyewear device 100. The beacon 630 in this example is broadcast by a beacon transmitter 620 associated with a fixed beacon location 720 in a physical environment 600. For example, a beacon transmitter 620 may be located near an object 650 (e.g., an exhibit, a work of art, an article of merchandise). The beacon 630 in some implementations includes a unique identifier, beacon data, and a device certificate.

The eyewear device 100 in this example includes a camera 114B, a loudspeaker 191, a content delivery application 910, a localization system 915, and a display 180B. In some implementations, the process of detecting beacons 630 is ongoing during active use of the eyewear device 100. In other examples, the process of detecting beacons 630 starts in response to receiving a selection through a user interface or through some other input means. The example step at block 822, in some implementations, includes storing the captured beacons 630 in memory 434 on the eyewear device 100, at least temporarily, such that the captured beacons 630 are available for analysis.

Figure 7:
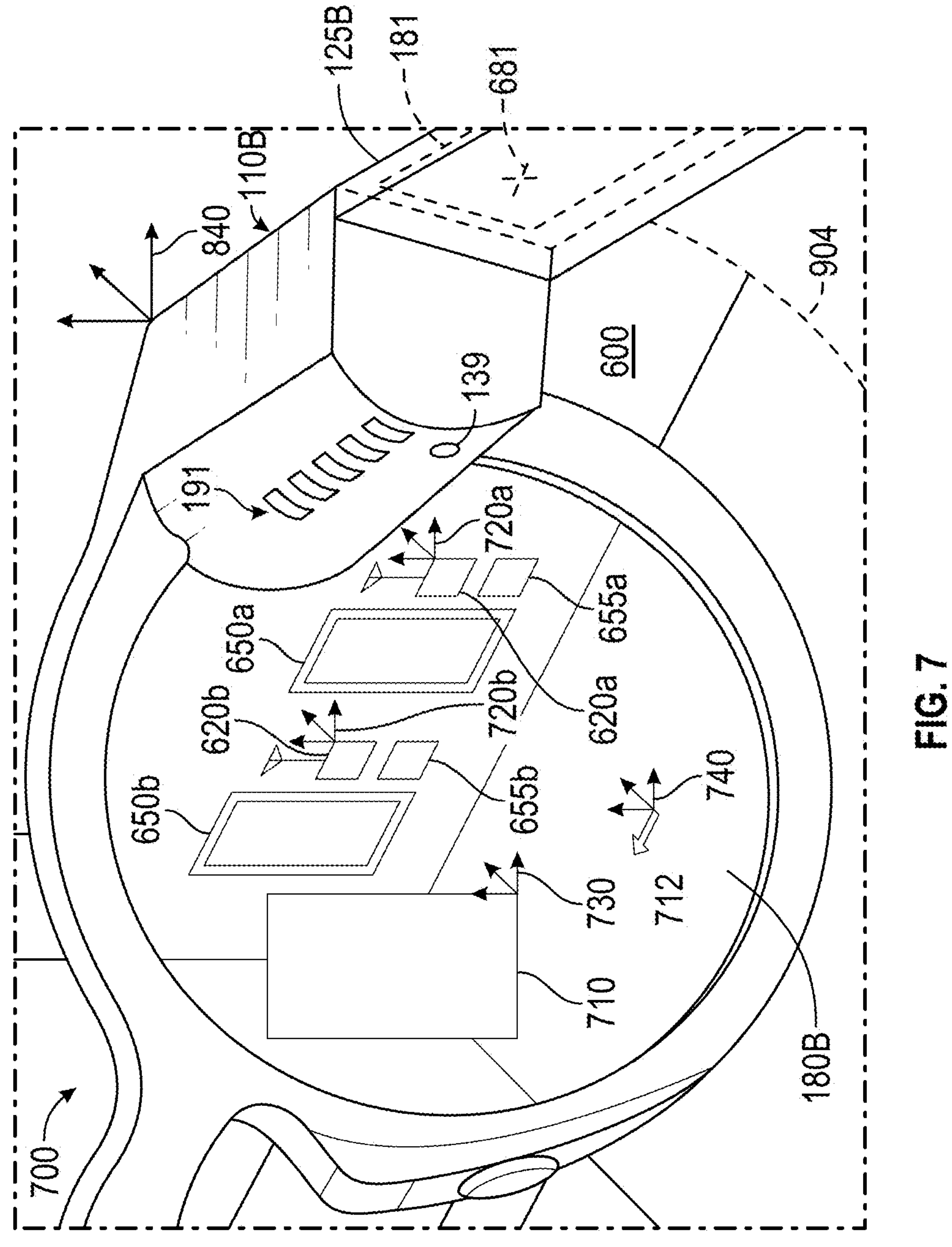
FIG. 7 is a perspective illustration of an example arrangement of beacon transmitters along with a virtual experience presented on a display.

FIG. 7 is a perspective illustration of an example arrangement of beacon transmitters 620*a*, 620*b* along with a virtual experience 700 presented on a display 180B. The physical environment 600, as shown, includes a first object 650*a*, a first beacon transmitter 620*a* located at a fixed beacon location 702*a*. When the beacon transmitters 620 are programmed and installed, the first beacon transmitter 620*a* is associated with the first object 650*a*. Also shown is a first beacon activation code 655*a* which is located at a fixed position relative to the fixed beacon location 702*a*. The beacon activation code 655*a* in some implementations is an optical code that contains encoded information readable by the camera 114B of the eyewear device 100.

Also shown in FIG. 7 is a second or subsequent object 650*b*, a subsequent beacon transmitter 620*b* located at a subsequent fixed beacon location 702*b*, and a subsequent beacon activation code 655*b*. In operation, the physical environment 600 may include a plurality of objects 650, each associated with its own beacon transmitter 620 and activation code 655. For example, an object 650 may be an exhibit, a work of art, an item of merchandise, a menu, or any other item.

In some implementations, the content delivery application 910 is configured to detect and act upon a certain subset of beacons which satisfy a device certificate rule 805. For example, when an owner or operator programs the beacon transmitters 620 for installation in a particular physical environment 600 (e.g., a retail store, a gallery, a museum), the beacon 630 is configured to include a device certificate that acts as a source identifier. The device certificate, for example, may include a unique numerical or text identifier (e.g., Mobile App, Macy's, MOMA). In this example, the device certificate rule 805 requires that only beacons 630 having a particular device certificate (e.g., Mobile App) will be detected and used. In other words, the content delivery application 910 is configured to detect only those beacons 630 which are programmed with a device certificate that includes "Mobile App." Other beacons with different device certificates will be ignored.

In response to a detected beacon 630 satisfying the device certificate rule 805, block 824 in FIG. 8 describes an example step of determining, with the localization system 915 and based on the detected beacon 630, a current eyewear location 840 relative to the fixed beacon location 720.

In some implementations, the beacons 630 broadcast by the beacon transmitters 620 are used to calculate or otherwise determine the current eyewear location 840 relative to the fixed beacon locations 720.

The signal strength of a beacon 630 varies according to distance. The greater the distance from the beacon transmitter 620, the lower the signal strength. The beacon 630 in some implementations is calibrated by the manufacturer to have a design signal strength at a known distance (e.g., one meter away from the beacon transmitter 620). In some implementations, the receiving device (e.g., an eyewear device 100) is configured to detect the actual signal strength, measured at the instant when the beacon 630 is received. Using the design signal strength and the actual signal strength, the receiving device can approximate the distance between the beacon transmitter 620 and the receiving device (based on a single beacon 630).

When two or more beacons 630 are detected, the receiving device in some implementations is configured to measure the actual received signal strength associated with each beacon 630. For example, referring again to FIG. 7, the first beacon transmitter 620*a* broadcasts a first beacon 630*a* which arrives at the eyewear device 100 having a first received signal strength 640*a*. A second or subsequent beacon transmitter 620*b* broadcasts a second beacon 630*b* which arrives at the eyewear device 100 having subsequent received signal strength 640*b*. Using the two received signal strengths 640*a*, 640*b*, the localization system 915 on the eyewear device 100 in some implementations uses one or more three-dimensional multilateration algorithms (sometimes referred to as triangulation or trilateration) to compute the precise current eyewear location 840 relative to the two fixed beacon locations 720*a*, 720*b*.

In the example step at block 824 in FIG. 8 of determining a current eyewear location 840, the localization system 915 does not use data from the GPS unit and does not construct a virtual map using a SLAM algorithm, as described herein. By using the beacons 630, which are broadcast relatively frequently (e.g., ten times per second, or more), the localization system 915 calculates and updates the current eyewear location 840 continually and frequently.

In some implementations, the current eyewear location 840 is shared with an application capable of generating an interactive map of the nearby physical environment 600. The map application in this example presents the current eyewear location 840 on the display 180B as an overlay (e.g., a blue dot, a marker) relative to other features of the map.

The process of localization in some implementations includes calculating a correlation between the detected beacon transmitters 620 and the current eyewear location 840. The term correlation refers to and includes one or more vectors, matrices, formulas, or other mathematical expressions sufficient to define the three-dimensional distance between one or more of the detected beacon transmitters 620 and the eyewear display 180B, in accordance with the current eyewear location 840. The current eyewear location 840, of course, is tied to or persistently associated with the display 180B which is supported by the frame of the eyewear device 100. In this aspect, the correlation performs the function of calibrating the motion of the eyewear 100 through the physical environment 600 with the apparent motion of the detected beacon transmitters 620 (relative to the eyewear 100). Because the localization process occurs continually and frequently, the correlation is calculated continually and frequently, resulting in accurate and near real-time tracking of the detected beacon transmitters 620 relative to the current eyewear location 840.

Block 826 in FIG. 8 describes an example step of retrieving content 800 associated with the detected beacon 630. The process of retrieving content 800 includes accessing one or more sources of information. For example, the content 800 may be retrieved from the data contained in the detected beacon 630 itself, from information stored in a content library 482, from local content stored on the eyewear device 100, or in some implementations from internet search results. The process in this example includes assembling search terms, executing a search, and harvesting content relevant to the detected beacon 630. The content delivery application 910, in some implementations, is configured to access one or more preferred search engines, websites, and other internet-based resources. In some implementations, the process of retrieving content 880 using an internet search involves using a machine-learning algorithm to select the search engine, web resources, and website data most likely to retrieve relevant container information quickly and efficiently.

In this example, the detected beacon 630 includes an activator or trigger which causes the content delivery application 910 to retrieve content 800 from one or more available sources.

Block 828 in FIG. 8 describes an example step of curating a virtual experience 700 in accordance with the retrieved content 800, the beacon data, and a user profile 880. The process of curating in some implementations includes simply presenting substantially all of the retrieved content 800 (e.g., text, audio files, video segments) or the beacon data. The beacon data, as described herein, may include one or more items of relevant content (e.g., text, audio files, video segments) suitable for presentation. The user profile 880 in some implementations includes one or more elements, such as a primary interest (e.g., art history, formal wear, vegetarian food), a playback setting (e.g., auto play), and one or more other preferences (e.g., play audio first, display text with audio, video segments preferred). In this aspect, the process of curating the virtual experience 700 includes consideration of the elements of the user profile 880. For example, for a detected beacon 630 associated with a restaurant menu (i.e., object 650), the retrieved content 800 may include a wide variety of food items on the menu. If the user profile 800 includes "vegetarian food" as a primary interest, the process of curating the virtual experience 700 may include presenting the vegetarian food items first or exclusively.

Block 830 in FIG. 8 describes an example step of presenting the curated virtual experience 700 on the display 180B in accordance with the determined current eyewear location 840. In this aspect, one or more elements of the curated virtual experience 700 may be sized and positioned on the display 180B according to the current eyewear location 840. As described herein, the process of presenting the curated virtual experience 700 may include playing an audio message through the loudspeaker 191, presenting text on the display, presenting a video segment on the display, and combinations thereof. FIG. 7 includes an example region or sector 710 of the display 180B which is suitable for presenting text, video, or other elements of the curated virtual experience 700. In this example, the sector 710 is located at a sector position 730 that is fixed relative to the display 180B (e.g., presented along the left side). In other implementations the size and shape of the sector 710, as well as the location of the sector position 730, is editable, configurable, dynamic in response to the size and shape of the content to be presented, or combinations thereof. In some implementations, the process includes presenting the curated virtual experience 700 on a second eyewear device, a mobile device (e.g., a smartphone, tablet), or another designated device.

Block 832 in FIG. 8 describes an example step of identifying a primary beacon 645 based on the relative proximity of two or more beacons 630 relative to the current eyewear location 840. As described above in relation to multilateration, the first or detected beacon 630*a* arrives at the eyewear device 100 having a first received signal strength 640*a*. A second or subsequent beacon 630*b* arrives at the eyewear device 100 having subsequent received signal strength 640*b*. The process of identifying a primary beacon 645 in this example includes comparing the two received signal strengths 640*a*, 640*b* and selecting the higher value (which represents the beacon transmitter closest in proximity to the current eyewear location 840).

Block 834 in FIG. 8 describes an example step of detecting a beacon 630 which, in some implementations, includes scanning and decoding a beacon activation code 655 instead of detecting the beacon wirelessly. For example, if a user desires to access a particular beacon, the camera 114B can be used to scan and decode a beacon activation code 655. As shown in FIG. 7, a first beacon activation code 655*a* is associated with the first beacon transmitter 720*a* and is located at a fixed location relative to the fixed beacon location 702*a*. The process of detecting the first beacon 630*a* in this example includes capturing frames of video data 900 within a field of view 904 of the camera 114B, decoding (within the captured frames of video data 900) the first beacon activation code 655*a*, and in response detecting the first beacon 630*a*. In this aspect, the process of decoding the first beacon activation code 655*a* provokes the selection of the first beacon 630*a*.

Block 836 in FIG. 8 describes an example step of detecting a beacon by making a selection from a list. As shown in FIG. 7, the first beacon transmitter 620*a* is associated with a first object 650*a*. The second or subsequent beacon transmitter 620*b* is associated with a second object 650*b*. In some implementations, this process includes presenting a list 865 within a sector 710 located at a sector position 730 on the display 180B. The list 865 includes the first object 650*a* and the subsequent object 650*b*, in order based on relative proximity to the determined current eyewear location 840 (e.g., the object 650 associated with the nearest beacon transmitter 620 is shown first). The process in this example includes receiving a selection 870 from the displayed list 865, and then detecting the beacon 630 in accordance with the received selection 870.

The process of receiving a selection 870 includes detecting a tapping gesture on a touchpad 181, processing a voice command using a voice recognition module, executing the selection in response to a predefined hand gesture detected within frames of video data 900 captured by the camera 114B, and combinations thereof.

The example eyewear device 100, as shown in FIG. 7, includes a touchpad 181 located on the right temple 125B. A movable element 711 (e.g., a cursor, as shown in FIG. 7) is presented at a current element position 740 relative to the display 180*b*. Interacting with the cursor 711, in some implementations, includes detecting a current fingertip location 681 relative to the touchpad 181, and then presenting the cursor 711 at a current element position 740 in accordance with the detected current fingertip location 681. The selection process in this example includes identifying a first item on the presented list 865 that is nearest to the current element position 740, detecting a tapping gesture of the finger relative to the touchpad 181, and then executing the selection 870 relative to the first item in accordance with the detected tapping gesture.

In some implementations, the process of receiving a selection 870 includes receiving human speech through a microphone 139 coupled to the eyewear device 100, as shown in FIG. 7, and then converting the speech into frames of audio data 905. The voice recognition module 925 analyzes the frames of audio data 905, using automated speech recognition processing, to identify a first command 860. The process in this example includes executing the selection 870 relative to the first item in accordance with the first command 760. In some implementations, the automated speech recognition involves using a machine-learning algorithm that has been trained to detect, decipher, and identify the contents of human speech quickly and efficiently.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of presenting a virtual experience using an eyewear device, the eyewear device comprising a camera, a memory, and a display, the method comprising:

storing a user profile in the memory;

capturing frames of video data using the camera;

detecting a beacon activation code in the frames of video data;

decoding the beacon activation code to obtain beacon data associated with an object in a physical environment, wherein the beacon data comprises a fixed beacon transmitter location relative to the physical environment;

determining a current eyewear location relative to the fixed beacon transmitter location;

retrieving content based on the beacon data;

curating a virtual experience based on the content and the user profile;

establishing a sector on the display according to the content wherein the sector comprises a sector location, a sector size, and a sector shape relative to the display;

adjusting dynamically at least one of the sector location or the sector shape based on the current eyewear location and the fixed beacon transmitter location;

estimating an object size associated with the object relative to the fixed beacon transmitter location;

adjusting dynamically at least one of the sector location or the sector size based on the current eyewear location and the object size; and presenting the virtual experience within the sector on the display in accordance with the current eyewear location and the fixed beacon transmitter location, such that presenting the virtual experience facilitates a view of both the content on the display and the object in the physical environment.

2. The method of claim 1, wherein presenting the virtual experience comprises:

presenting the content as an overlay relative to the physical environment; and presenting the content as an overlay relative to the object.

3. The method of claim 1, further comprising:

storing information associated with the beacon data in a content library; and storing local content associated with the beacon data in the memory, and wherein retrieving content comprises accessing one or more sources selected from a content group consisting of the beacon data, the information, the local content, and internet search results associated with the beacon data.

4. The method of claim 1, wherein shaping the sector comprises:

establishing a sector location relative to the display; and establishing a sector size based on at least a portion of the content, and wherein presenting the virtual experience comprises presenting the virtual experience within the sector size and at the sector location.

5. The method of claim 1, wherein presenting the virtual experience comprises presenting at least a portion of the content on a second display coupled to a second device.

6. The method of claim 1, wherein curating the virtual experience comprises:

maintaining the user profile comprising a primary interest, a playback setting, and one or more preferences; and populating the virtual experience with the content based on the user profile.

7. The method of claim 1, wherein presenting the virtual experience comprises one or more operations selected from a group consisting of playing an audio message through a loudspeaker, presenting text on the display, and presenting a video segment on the display.

8. The method of claim 1, wherein detecting a beacon activation code comprises detecting a plurality of beacon activation codes, the method comprising:

generating a list of the objects associated with each of the plurality of beacon activation codes;

presenting on the display the list as an overlay relative to the physical environment;

receiving a selection associated with a selected object from the list; and retrieving the content associated with the selected object.

9. The method of claim 8, wherein presenting the list comprises presenting on the display a movable element at a current element position as an overlay relative to the physical environment, and wherein receiving the selection comprises identifying the selected object based on the current element position.

10. The method of claim 8, wherein receiving the selection comprises identifying the selected object based on at least one of:

a predefined hand gesture detected in the frames of video data, or a command identified within human speech detected with a microphone coupled to the eyewear device.

11. A virtual experience presentation system, comprising:

an eyewear device comprising a camera, a memory storing a user profile, a processor, and a display;

programming in the memory, wherein execution of the programming by the processor configures the eyewear device to perform functions, including functions to:

capture frames of video data using the camera;

detect a beacon activation code in the frames of video data;

decode the beacon activation code to obtain beacon data associated with an object in a physical environment, wherein the beacon data comprises a fixed beacon transmitter location relative to the physical environment;

determine a current eyewear location relative to the fixed beacon transmitter location;

retrieve content based on the beacon data;

curate a virtual experience based on the content and the user profile;

establish a sector on the display according to the content, wherein the sector comprises a sector location, a sector size, and a sector shape relative to the display;

adjust dynamically at least one of the sector location, the sector size, or the sector shape based on the current eyewear location and the fixed beacon transmitter location;

estimate an object size associated with the object relative to the fixed beacon transmitter location;

adjust dynamically at least one of the sector location or the sector size based on the current eyewear location and the object size; and present the virtual experience within the sector on the display in accordance with the current eyewear location and the fixed beacon transmitter location, wherein the virtual experience facilitates a view of both the content on the display and the object in the physical environment, and wherein the virtual experience is presented as an overlay relative to the physical environment and the object.

12. The virtual experience presentation system of claim 11, wherein the function to shape the sector comprises functions to:

establish a sector location relative to the display; and establish a sector size based on at least a portion of the content, and wherein the function to present the virtual experience comprises functions to present the virtual experience within the sector size and at the sector location.

13. The virtual experience presentation system of claim 11, wherein the function to curate the virtual experience comprises functions to:

maintain the user profile comprising a primary interest, a playback setting, and one or more preferences; and populate the virtual experience with the content based on the user profile.

14. The virtual experience presentation system of claim 11, wherein the beacon activation code comprises a plurality of beacon activation codes, and wherein the execution configures the eyewear device to perform further functions to:

generate a list of the objects associated with each of the plurality of beacon activation codes;

present on the display the list as an overlay relative to the physical environment;

receive a selection associated with a selected object from the list, wherein the function to receive the selection comprises a function to identify the selected object based on at least one of (a) a current element position associated with a movable element presented on the display, (b) a predefined hand gesture detected in the frames of video data, or (c) a command identified within human speech detected with a microphone coupled to the eyewear device; and retrieve the content associated with the selected object.

15. A non-transitory computer-readable medium storing program code which, when executed, is operative to cause an electronic processor to perform the steps of:

storing a user profile comprising a primary interest, a playback setting, and one or more preferences;

capturing frames of video data using a camera coupled to an electronic eyewear device further comprising a display;

detecting a beacon activation code in the frames of video data;

decoding the beacon activation code to obtain beacon data associated with an object in a physical environment, wherein the beacon data comprises a fixed beacon transmitter location relative to the physical environment;

determining a current eyewear location relative to the fixed beacon transmitter location;

retrieving content based on the beacon data;

curating a virtual experience based on the content and the user profile;

establishing a sector on the display according to the content, wherein the sector comprises a sector location, a sector size, and a sector shape relative to the display;

adjusting dynamically at least one of the sector location, the sector size, or the sector shape based on the current eyewear location and the fixed beacon transmitter location;

estimating an object size associated with the object relative to the fixed beacon transmitter location;

adjusting dynamically at least one of the sector location or the sector size based on the current eyewear location and the object size; and presenting the virtual experience within the sector on the display in accordance with the current eyewear location and the fixed beacon transmitter location, wherein the virtual experience facilitates a view of both the content on the display and the object in the physical environment, and wherein the virtual experience is presented as an overlay relative to the physical environment and the object.

16. The non-transitory computer-readable medium storing program code of claim 15, wherein the beacon activation code comprises a plurality of beacon activation codes, and wherein the program code, when executed, is operative to cause the electronic processor to perform the steps of:

generating a list of the objects associated with each of the plurality of beacon activation codes;

presenting on the display the list as an overlay relative to the physical environment;

receiving a selection associated with a selected object from the list, wherein receiving the selection comprises identifying the selected object based on at least one of (a) a current element position associated with a movable element presented on the display, (b) a predefined hand gesture detected in the frames of video data, or (c) a command identified within human speech detected with a microphone coupled to the eyewear device; and retrieving the content associated with the selected object.

* * * * *